(12) United States Patent
Hao et al.

(10) Patent No.: US 10,177,371 B2
(45) Date of Patent: Jan. 8, 2019

(54) ELECTRODE HAVING CURRENT CORRECTING LAYERS

(71) Applicant: Nissan North America, Inc., Franklin, TN (US)

(72) Inventors: Xiaoguang Hao, Wixom, MI (US); Kenzo Oshihara, Novi, MI (US)

(73) Assignee: Nissan North America, Inc., Franklin, TN (US)

(*) Notice: Subject to any disclaimer, the term of this patent is extended or adjusted under 35 U.S.C. 154(b) by 70 days.

(21) Appl. No.: 14/928,424

(22) Filed: Oct. 30, 2015

(65) Prior Publication Data

US 2017/0125799 A1    May 4, 2017

(51) Int. Cl.
*H01M 4/36* (2006.01)
*H01M 4/62* (2006.01)
*H01M 4/134* (2010.01)
*H01M 10/052* (2010.01)

(52) U.S. Cl.
CPC ........ *H01M 4/366* (2013.01); *H01M 4/134* (2013.01); *H01M 4/624* (2013.01); *H01M 4/625* (2013.01); *H01M 4/626* (2013.01); *H01M 10/052* (2013.01); *H01M 2220/20* (2013.01); *Y02E 60/122* (2013.01)

(58) Field of Classification Search
None
See application file for complete search history.

(56) References Cited

U.S. PATENT DOCUMENTS

| | | |
|---|---|---|
| 7,000,297 B2 | 2/2006 | Frustaci et al. |
| 7,250,233 B2 | 7/2007 | Choi et al. |
| 7,553,584 B2 | 6/2009 | Chiang et al. |
| 7,972,537 B2 | 7/2011 | Meng et al. |
| 7,988,896 B2 | 8/2011 | Zhang et al. |
| 8,669,008 B2 | 3/2014 | Cho et al. |
| 8,920,978 B1 | 12/2014 | Gross et al. |
| 9,093,693 B2 | 7/2015 | Zhamu et al. |
| 2010/0297502 A1 | 11/2010 | Zhu et al. |
| 2011/0123866 A1 | 5/2011 | Pan et al. |
| 2012/0183856 A1 | 7/2012 | Cui et al. |
| 2013/0077515 A1 | 3/2013 | Jung et al. |
| 2014/0023920 A1 | 1/2014 | Yamazaki et al. |
| 2014/0045065 A1 | 2/2014 | Bao et al. |
| 2014/0057179 A1 | 2/2014 | Yushin et al. |
| 2015/0221929 A1 | 8/2015 | Lu |

FOREIGN PATENT DOCUMENTS

WO    9950921 A1    10/1999

*Primary Examiner* — Sarah A. Slifka
(74) *Attorney, Agent, or Firm* — Young Basile Hanlon & MacFarlane, P.C.

(57) ABSTRACT

Electrodes having at least one current correcting layer between the current collector and the separator drive electron flow in a direction perpendicular to the X-Y plane. Such an electrode includes a current collector, a first active material layer coated on the current collector, a first current correcting layer on the first active material layer opposite the current collector and a second active material layer on the first current correcting layer opposite the first active material layer. The first current correcting layer is a highly conductive, porous material that is not electrochemically active, the first current correcting layer being uniformly formed along an X-Y plane of the electrode.

9 Claims, 2 Drawing Sheets

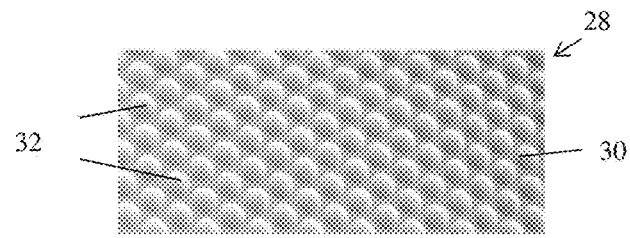
FIG. 3
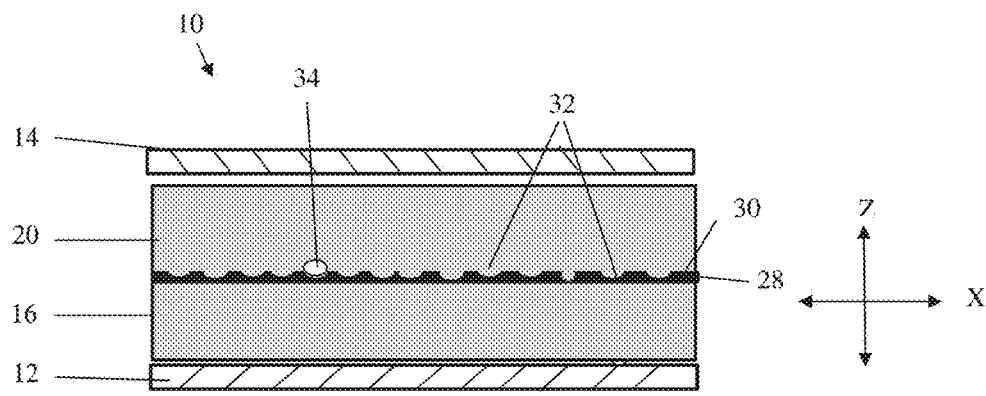
FIG. 4
FIG. 5
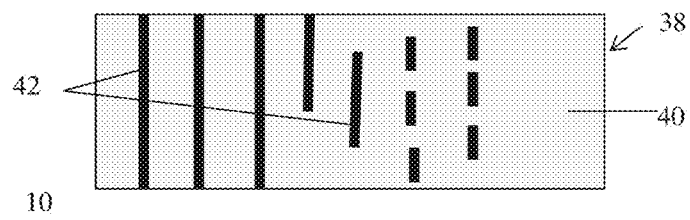
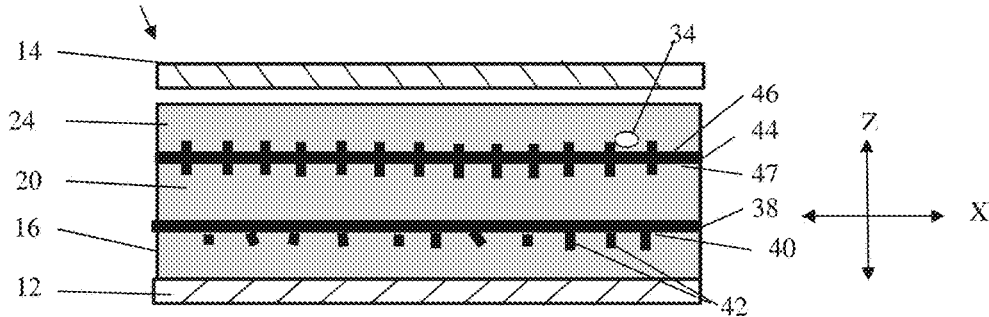
FIG. 6

ELECTRODE HAVING CURRENT CORRECTING LAYERS

TECHNICAL FIELD

This disclosure relates to an electrode having one or more current correcting layers in the active material unit.

BACKGROUND

Hybrid vehicles (HEV) and electric vehicles (EV) use chargeable-dischargeable power sources. Secondary batteries such as lithium-ion batteries are typical power sources for HEV and EV vehicles. Lithium-ion secondary batteries typically use carbon, such as graphite, as the anode electrode. Graphite materials are very stable and exhibit good cycle-life and durability. However, graphite material suffers from a low theoretical lithium storage capacity of only about 372 mAh/g. This low storage capacity results in poor energy density of the lithium-ion battery and low electric mileage per charge.

To increase the theoretical lithium storage capacity, silicon has been added to active materials. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon causes particle cracking and pulverization. This deteriorative phenomenon escalates to the electrode level, leading to electrode delamination, loss of porosity, electrical isolation of the active material, increase in electrode thickness, rapid capacity fade and ultimate cell failure.

SUMMARY

Disclosed herein are electrodes having at least one current correcting layer between the current collector and the separator. One embodiment of an electrode comprises a current collector, a first active material layer coated on the current collector, a first current correcting layer on the first active material layer opposite the current collector and a second active material layer on the first current correcting layer opposite the first active material layer. The first current correcting layer is a highly conductive, porous material that is not electrochemically active, the first current correcting layer being uniformly formed along an X-Y plane of the electrode and configured to drive electron flow in a direction perpendicular to the X-Y plane.

The electrode can further comprise a second current correcting layer on the second active material layer and a third active material layer on the second current correcting layer opposite the second active material layer, the second current correcting layer being the highly conductive, porous material that is not electrochemically active. The second current correcting layer is uniformly formed along an X-Y plane of the electrode and configured to work with the first current correcting layer to drive electron flow in the direction perpendicular to the X-Y plane.

Another embodiment of an electrode comprises a plurality of active material layers, one of the plurality of active material layers being adjacent a current collector and another of the plurality of active material layers facing a separator; and a plurality of current correcting layers, each current correcting layer between adjacent active material layers, the plurality of current collecting layers being one less than the plurality of active material layers. The plurality of current correcting layers are spaced from between 10 microns to 20 microns along a stacking direction of the electrode, each of the plurality of current correcting layers uniformly formed parallel to the current collector and formed of a highly conductive, porous material that is not electrochemically active and configured to drive electron flow in a direction perpendicular to the current collector.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures:

FIG. 3 is a plan view of an example of a current correcting layer with dimples;

FIG. 4 is a schematic of an electrode having the current correcting layer FIG. 3;

FIG. 5 is a plan view of another example of a current correcting layer with branches; and FIG. 6 is a schematic of another electrode using variations of the current correcting layer of FIG. 5.

DETAILED DESCRIPTION

Because the carbon material used in electrodes of conventional batteries, such as lithium ion batteries or sodium ion batteries, suffers from a low specific capacity, the conventional battery has poor energy density even though there is small polarization and good stability. Furthermore, batteries having electrodes of graphite or other carbon materials develop increased internal resistance over time, which decreases their ability to deliver current.

To address the poor energy density of carbon based electrodes, alternative active materials with higher energy densities are desired. Alloying particles such as silicon, tin, germanium and their oxides and alloys are non-limiting examples of materials that may be added to an electrode active material layer to improve its energy density, among other benefits.

One particular example is the use of silicon in lithium-ion batteries. Electrode materials such as silicon react with lithium via a different mechanism than graphite. Lithium forms alloys with silicon materials, which involves breaking the bonds between host atoms, causing dramatic structural changes in the process. Since the silicon does not constrain the reaction, anode materials that form alloys can have much higher specific capacity than intercalation electrode materials such as graphite. Silicon based anode active materials have potential as a replacement for the carbon material of conventional lithium-ion battery anodes due to silicon's high theoretical lithium storage capacity of 3500 to 4400 mAh/g. Such a high theoretical storage capacity could significantly enhance the energy density of the lithium-ion batteries. However, silicon active materials suffer from rapid capacity fade, poor cycle life and poor durability. One primary cause of this rapid capacity fade is the massive volume expansion of silicon (typically up to 300%) and structural changes due to lithium insertion. Volume expansion of silicon can cause particle cracking and pulverization when the silicon has no room to expand, which leads to delamination of the active material from the current collector, electrical isolation of the fractured or pulverized active material, capacity fade due to collapsed conductive pathways, and increased internal resistance over time.

Disclosed herein are electrodes configured to address the issues discussed above by enhancing electrode flow in the direction perpendicular to the current collector, reducing side reactions and increasing the structural stability of the electrode. The electrodes disclosed herein incorporate one or more current correcting layers that improve current distribution in the electrode, improve potential distribution in the electrode, and result in higher coulombic efficiency.

Figure 1:
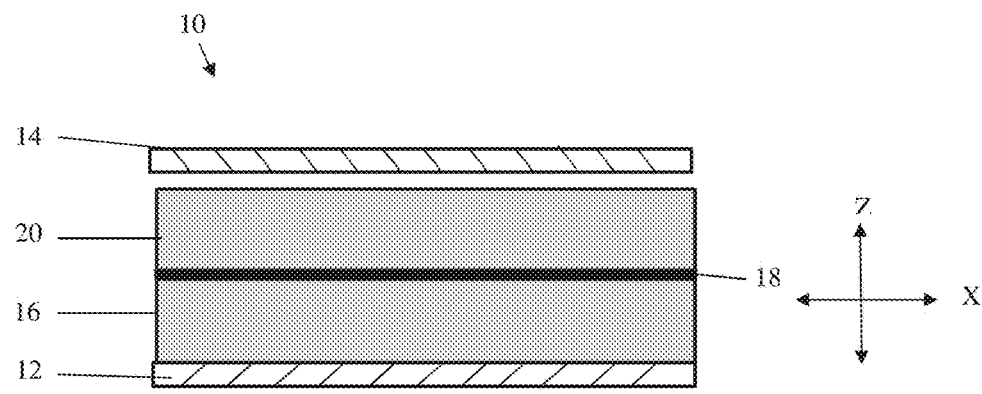
FIG. 1 is a schematic of an electrode with a current correcting layer as disclosed herein.

FIG. 1 is a cross sectional schematic illustrating an electrode 10 comprising a current collector 12, a separator 14 and a first active material layer 16 coated on the current collector 12. A first current correcting layer 18 is adjacent the first active material layer 16 opposite the current collector 12. A second active material layer 20 is adjacent the first current correcting layer 18 opposite the first active material layer 16. The first current correcting layer 18 is uniformly formed along an X-Y plane of the electrode 10 and configured to drive electron $e^-$ flow in a direction Z perpendicular to the X-Y plane.

Figure 2:
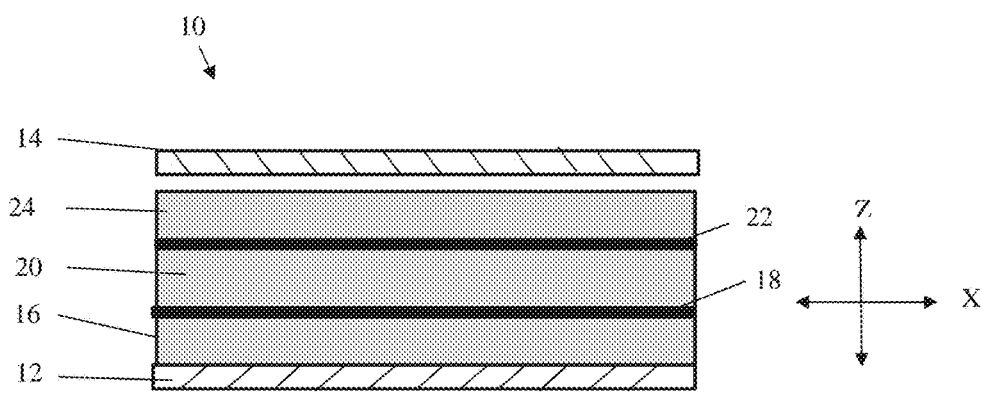
FIG. 2 is a schematic of another electrode with current correcting layers as disclosed herein.

Another embodiment of an electrode 10' as disclosed herein is illustrated in FIG. 2. Like the embodiment in FIG. 1, electrode 10' has a current collector 12, a separator 14 and a first active material layer 16 coated on the current collector 12. A first current correcting layer 18 is adjacent the first active material layer 16 opposite the current collector 12. A second active material layer 20 is adjacent the first current correcting layer 18 opposite the first active material layer 16. Electrode 10' further has a second current correcting layer 22 on the second active material layer 20 and a third active material layer 24 on the second current correcting layer 22 opposite the second active material layer 20. Like the first current correcting layer 18, the second current correcting layer 22 is uniformly formed along an X-Y plane of the electrode and configured to work with the first current correcting layer 18 to drive electron $e^-$ flow in the direction Z perpendicular to the X-Y plane. The first current correcting layer 18 and the second current correcting layer 22 are between 10 and 20 microns apart.

FIGS. 1 and 2 are provided as non-limiting examples. It is contemplated herein that an electrode can include any plurality of active material layers, with one of the plurality of active material layers being adjacent a current collector and another of the plurality of active material layers facing a separator. An electrode can also include any plurality of current correcting layers, each current correcting layer between adjacent active material layers, the plurality of current collecting layers being one less than the plurality of active material layers. The current correcting layers are separated by between about 10 and 20 microns of active material layer.

Each current correcting layer 18, 22 is a highly conductive, porous material that is not electrochemically active. Examples of materials that may be used as the current correcting layer include, but are not limited to, carbon black, graphene, carbon nanotubes, metal powders and conductive polymers. When more than one current correcting layer is used, the current correcting layers can be of the same material or can each be a different material as required to attain the desired results. The current correcting layers can also include a binder material to assist in the application of the layer. For example, one to two percent by weight binder material can be used. A current correcting layer 18 can be spray coated onto the adjacent active material layer 16 or can be slurry coated onto the adjacent active material layer 16. Each of the current correcting layers is between about ten nanometers and one micron in thickness.

Whether the active material layer is formed of graphite or other active material, the current correcting layer 18 or layers 18, 22 will improve the efficiency of the electrode 10, 10' by correcting current direction, i.e., increasing electron flow in the direction Z perpendicular to the current collector 12 and decreasing current flow in the X-Y direction. The current correcting layer 18 or layers 18, 22 also provides stability to the electrode structure.

FIGS. 3 and 4 illustrate another aspect of the current correcting layers 18, 22 disclosed herein. The current correcting layer 28 shown in FIG. 3 has an active material-facing surface 30 that is modified with dimples 32. FIG. 4 illustrates the current correcting layer 28 between active material layers 16, 20. The current correcting layer 28 can comprise dimples 32 in one or both active material-facing surfaces 30, although only one is illustrated in FIG. 4. As used herein, the term "dimples" refers to any surface characteristic that provides for some sort of recess in the active material-facing surface 30 of the current correcting layer 28 in which active particles 34 in a respective active material layer 16, 20 can seat. The dimples 32 can be uniformly formed as illustrated in FIG. 3 or can have different sizes and be in a non-uniform pattern.

FIGS. 5 and 6 illustrate another aspect of the current correcting layers 18, 22 disclosed herein. The current correcting layer 38 shown in FIG. 5 has an active material-facing surface 40 that is modified with branches 42. The current correcting layer 38 can comprise branches 42 from one or both active material-facing surfaces 40, 41. Current correcting layer 38 illustrates branches 42 extending from one active material-facing surface 40 while current correcting layer 44 illustrates branches 42 extending from both active material-facing surfaces 46, 47 in FIG. 6. As used herein, the term "branches" refers to any surface characteristic extending from the surface that defines a recess with the active material-facing surface of the current correcting layer in which active particles 34 in a respective active material layer can seat. FIG. 5 illustrates different branch 42 configurations. The branches 42 can be shaped more like walls that extend across a length or width of the surface. The branches 42 can be any portion of a length or width of the surface. The branches 42 can be columns, or can be mounds. The branches 42 can be uniformly spaced along the surface, can have different sizes or be in a non-uniform pattern.

When the active particles comprise one or more of silicon, tin or germanium, the dimples 32 or branches 42 provide stability to the respective active material layer and also reduce shearing in the respective active material layer when the active particles undergo lithiation and delithiation. The branches 42 in particular can restrain expansion of the active particles seated therein to one direction.

The branched current correcting layer can be formed from a grafted conductive polymer, calcined carbon to form carbon fibers with branches, or metal on which a mask of polystyrene beads is formed in which sputtered metal grows the domain branches. The polystyrene mask is dissolved by toluene afterwards.

As described herein, the methods and systems include a series of steps. Unless otherwise indicated, the steps described may be processed in different orders, including in parallel. Moreover, steps other than those described may be included in certain implementations, or described steps may be omitted or combined, and not depart from the teachings herein. The use of the term "collecting" is not meant to be limiting and encompasses both actively collecting and receiving data.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrode comprising:
   a current collector;
   a first active material layer coated on the current collector;
   a first current correcting layer on the first active material layer opposite the current collector; and
   a second active material layer on the first current correcting layer opposite the first active material layer, wherein:
     the first current correcting layer is a conductive, porous material that is not electrochemically active,
     the first current correcting layer is uniformly formed along an X-Y plane of the electrode and configured to drive electron flow in a direction perpendicular to the X-Y plane,
     the first current correcting layer comprises dimples in both active material-facing surfaces, and
     active particles of the first active material layer and the second active material layer seat in the dimples on a respective active material-facing surface.

2. The electrode of claim 1, wherein the first current correcting layer is formed from one or more of carbon black, graphene, carbon nanotubes, metal powder and conductive polymer.

3. The electrode of claim 2, wherein the first current correcting layer further comprises a binder material.

4. The electrode of claim 1, wherein the first current correcting layer is between 10 nm and 1 micron thick.

5. The electrode of claim 1, further comprising:
   a second current correcting layer on the second active material layer; and
   a third active material layer on the second current correcting layer opposite the second active material layer, wherein:
     the second current correcting layer is additional conductive, porous material that is not electrochemically active,
     the second current correcting layer is uniformly formed along an X-Y plane of the electrode and configured to work with the first current correcting layer to drive electron flow in the direction perpendicular to the X-Y plane, and
     the second current correcting layer comprises dimples in both active material-facing surfaces.

6. The electrode of claim 5, wherein the second current correcting layer is formed from one or more of carbon black, graphene, carbon nanotubes, metal powder and conductive polymer.

7. The electrode of claim 6, wherein the second current correcting layer further comprises a binder material.

8. The electrode of claim 5, wherein the second current correcting layer is between 10 nm and 1 micron thick.

9. The electrode of claim 5, wherein the first current correcting layer and the second current correcting layer are between 10 and 20 microns apart.

* * * * *